(12) United States Patent
Pfister

(10) Patent No.: US 6,857,332 B2
(45) Date of Patent: Feb. 22, 2005

(54) LINEAR OR ROTARY ACTUATOR

(75) Inventor: Jean-François Pfister, Sonceboz (CH)

(73) Assignee: Societe Industrielle de Sonceboz SA, Sonceboz (CH)

( * ) Notice: Subject to any disclaimer, the term of this patent is extended or adjusted under 35 U.S.C. 154(b) by 0 days.

(21) Appl. No.: 10/276,461

(22) PCT Filed: May 11, 2001

(86) PCT No.: PCT/IB01/00816

§ 371 (c)(1),
(2), (4) Date: Nov. 18, 2002

(87) PCT Pub. No.: WO01/89062

PCT Pub. Date: Nov. 22, 2001

(65) Prior Publication Data

US 2003/0117037 A1 Jun. 26, 2003

(30) Foreign Application Priority Data

May 19, 2000 (EP) .............................................. 00110734

(51) Int. Cl.⁷ ............................. F16H 25/20; H02K 7/06
(52) U.S. Cl. ........................ 74/89.34; 74/89.4; 310/20; 310/80; 310/86
(58) Field of Search ............................ 74/89.23, 89.34, 74/89.4, 89.41; 310/12, 20, 83, 86, 88; 384/615

(56) References Cited

U.S. PATENT DOCUMENTS

| 4,019,616 A | * | 4/1977 | Thorne ....................... 400/320 |
| 4,362,344 A | * | 12/1982 | Lederman .................... 384/482 |
| 4,850,459 A | | 7/1989 | Johannesen |
| 4,928,543 A | | 5/1990 | Johannesen |
| 5,100,271 A | | 3/1992 | Hattori |
| 5,491,633 A | * | 2/1996 | Henry et al. .................. 701/36 |

* cited by examiner

Primary Examiner—William C. Joyce
(74) Attorney, Agent, or Firm—Clifford W. Browning; Woodard, Emhardt, Moriarty, McNett & Henry LLP

(57) ABSTRACT

An actuator (1) for the linear displacement of a member to be controlled comprising a motor part (2) and an actuating device part (3) including a threaded screw (11) with linear displacement, and a rotary member (9) provided with a threaded portion (10) matching the screw thread, the rotary member capable of being driven in rotation by the motor part and being supported by bearings (15,16) in the form of roller bearing stops with four contact points arranged on either axial side of said threaded portion to guide the rotary member axially and radially. The raceways of the balls are directly in the rotary member and integral with parts of the body (14) or the cover (13) of the actuator.

8 Claims, 3 Drawing Sheets

LINEAR OR ROTARY ACTUATOR

The present invention concerns a linear or rotary actuator comprising a member rotated by an electric motor for the displacement of a member to be controlled. The member may more particularly be a nut in a screw and nut mechanism for the linear displacement of a member to be controlled.

BACKGROUND OF THE INVENTION

Linear actuators are very common and are used in many different applications, with examples being described in the European patent applications EP-A-468 920 and EP-A-987 477. The devices described in these publications comprises a step motor driving a screw and nut mechanism for the linear displacement of a shaft integral with a screw. The step motor allows the screw shaft to be rapidly displaced and positioned with few mechanical carts and using relatively simple controls.

In EP-A-468 920, a pinion mounted on the motor axle engages with a wheel that is integral with the nut. A hub of the wheel is sandwiched between flanges of a housing for axial positioning of the wheel. This axial bearing is not very rigid and performs poorly owing to friction. In certain applications, on the other hand, the electric motor must be separated from the member to be displaced, for reasons of sealing or safety such as are present in supply systems for combustible gases or liquids. A device such as that described in EP-A-468 920 cannot be used, since the separation between motor and screw is insufficient.

In EP-A-987 477, permanent magnets are mounted on the nut which thus is driven directly by the magnetic field created by the coils of the motor. The nut is mounted in the motor on just one bearing. The axial and radial support of the nut is very loose and thus unstable, both with respect to static and with respect to dynamic forces. Yet in many applications, stability is an important criterion, since the screw is coupled to the nut that at the same time serves as a guide determining the stability and the axial and radial positioning of the screw.

It is necessary not only to improve the efficiency and reliability of an actuator of the type cited, but also to reduce the price and size of these devices.

The device described in EP-A-987 477 is provided with a partition wall between the coils of the motor and the magnets mounted on the nut, for applications where a seal between the motor and the member to be controlled is necessary. This partition wall comprises a flange resting on a housing of the motor's stator part on one hand, and on a seal of the type of an O-ring sandwiched between the flange and a cover part of the actuator on the other hand. The reliability of sealing thus depends on the quality of the seal, which may deteriorate with time, may move when exposed to impacts, or may be poorly installed, for instance at the time of manufacturing of the motor. It will be advantageous to improve the reliability and safety of such devices, particularly in applications involving combustible liquids.

SUMMARY OF THE INVENTION

It is an object of the invention to realize an actuator that is efficient, reliable and not very expensive.

It will be advantageous for applications where sealing or separation is required between the electric motor and the member to be controlled, to realize an actuator that has reliable sealing.

It will be advantageous, moreover, to realize a device having few parts so as to reduce manufacturing and assembly costs.

It will also be advantageous to realize a linear or rotary actuator that is compact yet rigid and precise.

Objects of the invention have been realized by an actuator according to claim 1.

In the present invention, an actuator for the linear displacement of a member to be controlled comprises a motor part and an actuating device part including a screw moving linearly, and a rotary member having a threaded portion matching the screw's thread that can be rotated by the motor part, the rotary member being supported by bearings in the form of thrust ball bearings having four contact points located on each axial side of a threaded portion of the rotary member so as to axially and radially guide this member, the raceways of the balls being directly integrated, on one hand into the rotary member and on the other hand into the housing or housing parts of the actuator.

The raceways are preferably formed from stamped steel metal that may be hardened by a tempering operation. The raceways may be attached to the rotary member and to the portions of the housing or flange by elastic tongues that allow parts to be snapped in an axial direction corresponding to the direction of the axis of rotation of the rotary member while the screw, the balls and the flanges may also all be mounted in an axial direction on the motor part. The raceways may also be glued, welded or molded to said nut and to the housing or housing parts.

This design advantageously allows the costs of manufacture of the parts and of assembly to be appreciably reduced. The thrust ball bearings with four contact points present on each side of the rotary member yield a highly rigid, stable, precise and compact design.

The points of contact between the balls and the surfaces inclined radially inward and radially outward are arranged so as to satisfy the relation: A/B=C/D, where D and C are the radii of the contact points radially inward and radially outward from the axis of rotation of the rotary member, and B and A are the diameters of the trajectories of the contact points radially inward and radially outward on the ball. This arrangement of the contact points ensures that the balls will roll on the raceways without slipping.

According to another aspect of the present invention, an actuator for the linear or rotary displacement of a member to be controlled comprises a motor part, an actuating device part with a rotary member having magnetized portions, the rotary member being able to be driven by the motor part, an air gap being formed between the magnetized portions and the motor part, the actuator in addition comprising a continuous partition wall between the motor part and the actuating part and having a portion located in said air gap, characterized by the fact that a portion of the partition wall has the shape of an outer flange that can be mounted onto a support or onto a assembly wall of a device to be controlled.

This economic design has the advantage of providing a reliable separation between the motor part and the actuating part constituting a seal, not only with respect to fluid leakage but also from an electric point of view. Electric arcs originating in the electric motor part are thus highly effectively and reliably separated from the actuating part.

The actuating part can be designed as part of a screw and nut mechanism comprising a screw with linear displacement driven by a nut forming the rotary member coupled to the motor.

The magnetized portions may comprise one or several magnets fixed to or integral with the nut. The magnets on the rotary member preferably are permanent magnets but may also be electromagnets.

The partition wall or at least the portion located in the air gap may be made of a magnetic material so as to boost the magnetic flux across the air gap.

The partition wall may be made of an electro-conductive material such as a steel sheet that on one hand is strong and inexpensive and on the other hand ensures an electric and physical separation of the motor part from the screw and nut mechanism.

The partition wall may advantageously function as a structural element for the assembly and positioning of the motor part and of the actuating part.

BRIEF DESCRIPTION OF THE DRAWINGS

Other objects and advantageous aspects of the invention will become apparent from the claims and description and from the appended drawings in which:

DETAILED DESCRIPTION OF THE PREFERRED EMBODIMENTS

Figure 1:
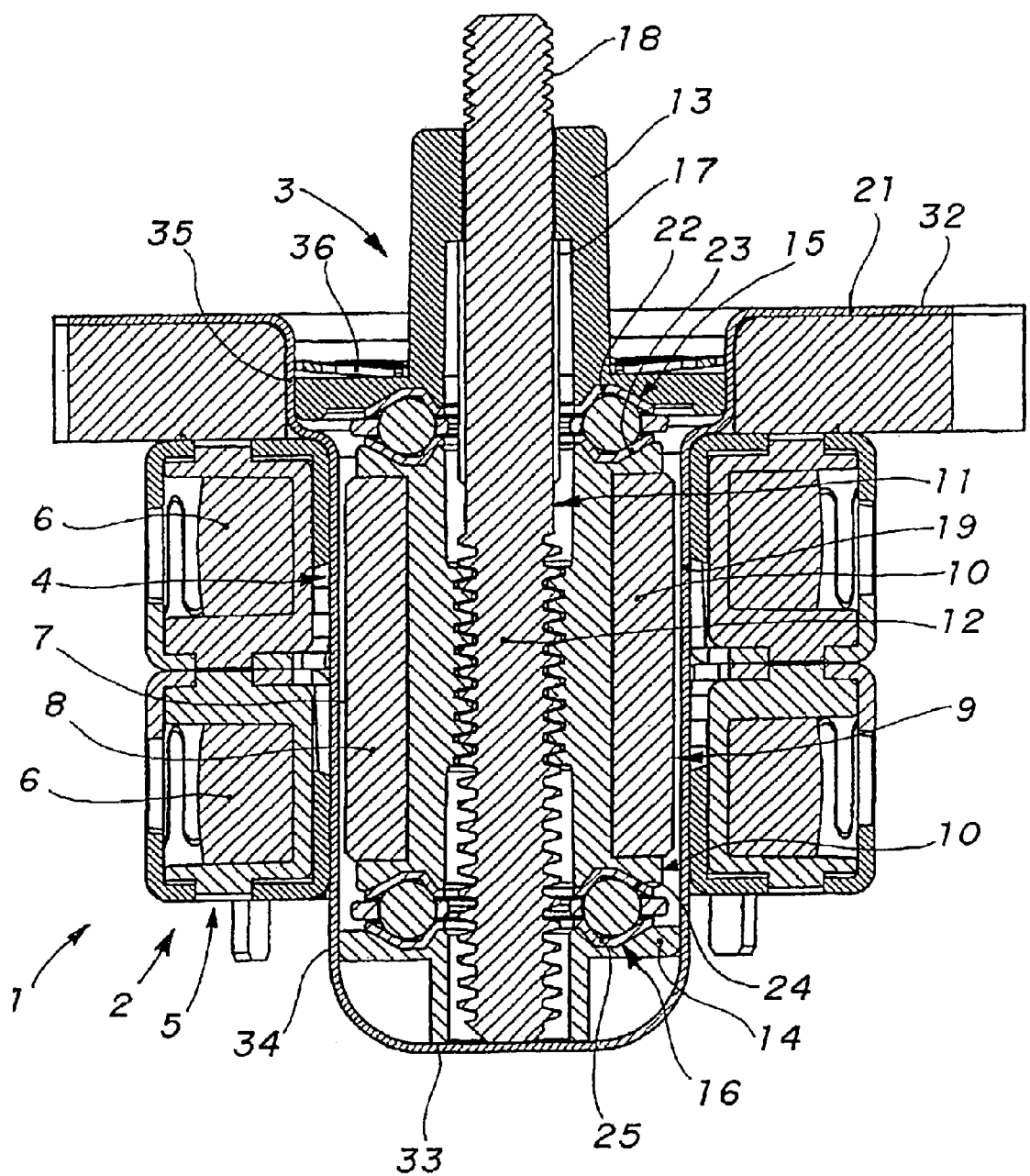
FIG. 1 is a sectioned view of a linear actuator according to a first embodiment of the invention.

Referring now to FIG. 1, an actuator 1 comprises an electric motor part 2, an actuating part 3 and a partition wall 4. The electric motor part 2 in these examples comprises a step motor having aspects similar to those of conventional step motors, such as the stator 5 with two portions 6 with coils separated by an air gap 7 of permanent magnets 8 mounted on a rotary member 9 of the actuating part 3. The use of a step motor is advantageous inasmuch as it allows an easy, rapid setting of the position of the member to be controlled in a compact, not very expensive design. Nevertheless, other types of reversible motors may be used in the present invention.

The actuating part 3 comprises the rotary member 9 provided with a threaded portion 10 engaging with a matching member in the form of a screw 11 having a threaded portion 12, a cover part 13, a housing part 14 and bearings 15, 16 supporting the rotary member 9 when rotating.

In the embodiment illustrated, rotation of the rotary member 9 causes axial displacement of the screw 11 that is provided with axial guiding elements 17 cooperating with a matching axial guiding shape or elements of cover part 13 blocking rotation of the screw. The screw 11 may be coupled to a member to be displaced (not illustrated), for instance by fastening it to a threaded portion 18 of the screw protruding beyond the cover part 13.

Other variants are possible, however, without going beyond the scope of the invention. For example, the rotary member may be integral with a screw that linearly displaces a nut coupled to the member to be controlled, or being itself part of the member to be controlled. In another variant the screw may be replaced by other members, for instance an axle for rotary actuation of the member to be controlled.

In the variant illustrated, screw 11 may for instance be coupled to a member controlling the flow rate of a fuel gas in a fuel supply or draining system, a specific example being a system for adjusting the flow rate in gas burners.

For reasons of safety, it will be important in such applications to separate the electric motor part from the part actuating the valve or other member in or near a combustible fluid.

In the present invention, the partition wall 4 arranged between the actuating part 3 and the motor part 2 is continuous, and extends to the outside of the actuator, thus forming a very efficient and reliable separation between these parts.

In advantageous embodiments, the partition wall 4 is formed by a conducting wall such as metal sheet that can be connected electrically to the installation being controlled (and to ground) so that there will be no electric potential difference between this wall and the installation being controlled.

The wall allows the motor part to be separated from the screw and nut mechanism by a physical and electric seal, particularly when the wall is electrically conducting.

The partition wall 4 comprises a cylindrical portion 19 in the air gap 7 between stator 5 and the magnets 8 on the rotary member 9, a bottom part 20 and an external part 21 in the form of a flange having a surface 32 to be mounted on a support or on a wall of a device to be controlled. The partition wall 4 or at least the portion 19 in the air gap may be made of a material having a good magnetic permeability, so as to boost the magnetic flux between the stator 5 and the magnets 8.

The stator 5 of the motor is disposed around the partition wall 4, and the actuating part 3 is disposed inside the cylindrical portion 19 through an axial and a radial positioning surface 33, 34 of the housing part 14 and through positioning surfaces 35 of the cover part 13, all these surfaces resting against the partition wall.

The cover part 13 is retained by mechanical fastening means such as an elastic ring or a check spring 36 engaged, on one hand with the cover part and on the other hand with the partition wall.

Advantageously, the partition wall is at once a structural element allowing the motor part to be assembled with the actuating part 3.

Bearings 15, 16 of the rotary member are thrust ball bearings with three or four contact points for the axial and radial positioning of the rotary member, one bearing being located on each side of the threaded portion 10 of the rotary member. One of the bearings 15 is located between the cover part 13 and the rotary member 9, the other bearing 18 is located between the rotary member and the housing part 14 that is mounted to the partition wall 4. The raceways 22, 23 of the ball bearing 15 are integral with the cover part 13 and rotary member 9, respectively, while the raceways 24, 25 of the thrust ball bearing 16 are integral with the rotary member 9 and housing part 14, respectively.

The raceways are advantageously made of stamped steel metal. They may then be welded, glued, molded, or mechanically attached to the cover part, rotary member or housing part. Advantageously, this yields a particularly compact and rigid design having economic manufacturing costs. In fact, the actuator consists of few parts that are easy to assemble, which strongly reduces the manufacturing costs. It should be noted, for instance, that parts such as the ball bearings, the rotary member, the cover part, the partition wall and the motor may be assembled in an axial direction, thus facilitating the automation of the actuator assembly procedures.

Figure 2:
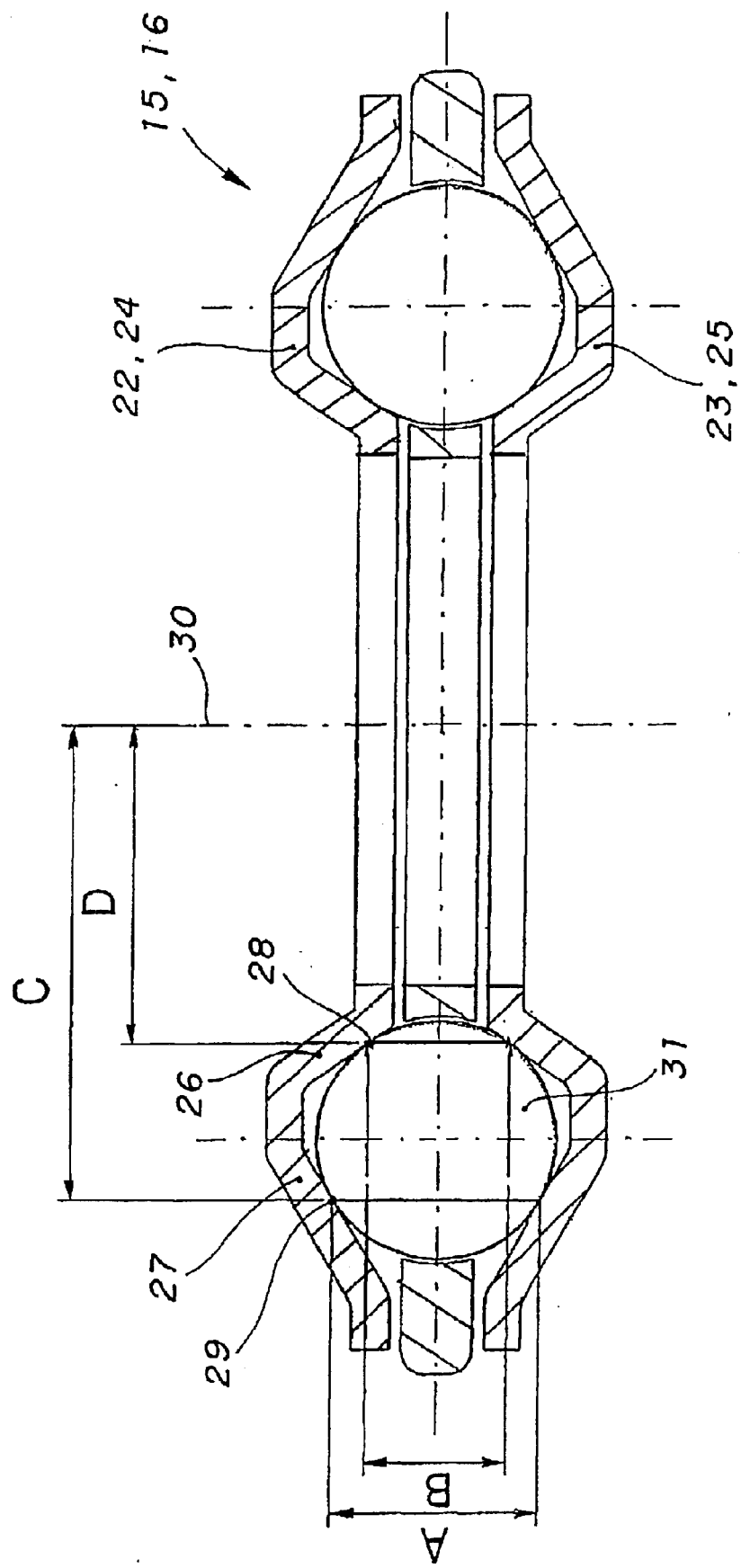
FIG. 2 is a detailed sectioned view of one of the bearings of an actuator according to the invention.

Referring now to FIG. 2, the inclined walls radially inward 26 and radially outward 27 of the raceways are arranged so as to satisfy the relation: A/B=C/D, where D and C are the radii of the contact points radially inward 28 and radially outward 29 from the axis of rotation 30 of the rotary member, while B and A are the diameters of the trajectories of the contact points radially inward 28 and radially outward 29 on the ball. When this relation is obeyed, the balls 31 will roll on the raceways 22, 24 and 23, 25 without slipping, and hence with a minimum of wear and resistance.

Figure 3:
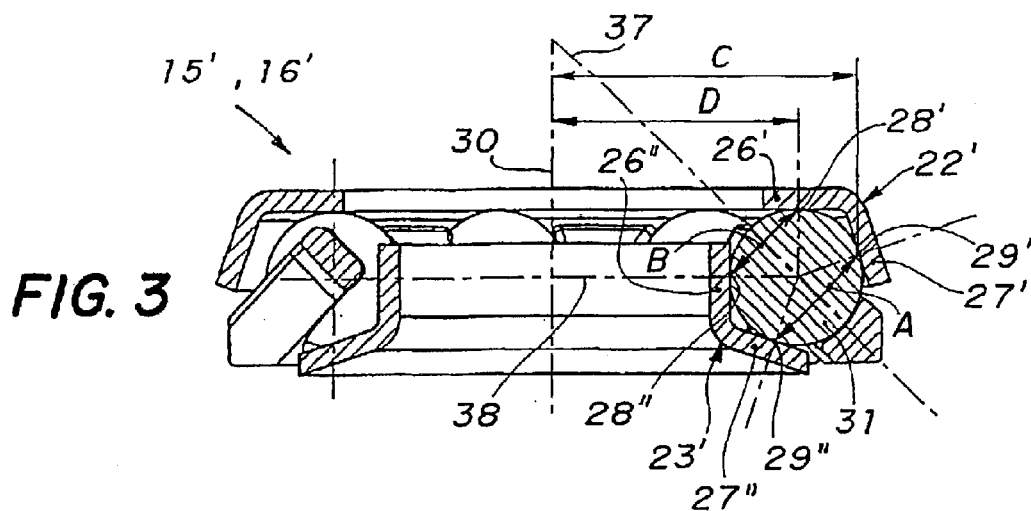
FIG. 3 is a detailed sectioned view of another embodiment of a bearing of an actuator according to the invention.
Figure 4:
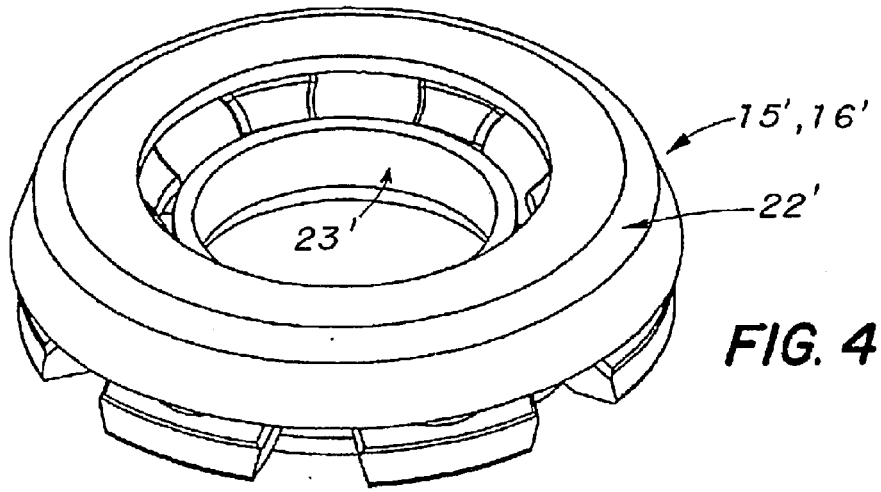
FIG. 4 is a perspective view of the bearing according to FIG. 3.

FIGS. 3 and 4 show another embodiment of the bearings in which the axis of rotation 37 of the balls 31 is inclined relative to the plane 38 passing through the centers of the balls. One of the raceways 22' is located radially outward from the balls, the other raceway 23' is located radially inward from the balls. In this embodiment, the inclined walls radially inward 26', 26" and radially outward 27', 27" of the raceways are again arranged so as to satisfy the relation: A/B=C/D, where D and C are the radii of the contact points radially inward 28' and radially outward 29' from the axis of rotation 30 of the rotary member, while B and A are the diameters of the circles travelled by the contact points radially inward 28' and radially outward 29' on the ball 31. When this relation is obeyed, the balls will roll on the raceways without slipping. This arrangement of the raceways, which leads to the inclination of the axis of rotation 37 of the balls, allows the bearings to sustain higher radial forces than the bearings according to FIG. 2. In other words, the bearings according to FIGS. 3 and 4 have a higher radial rigidity than the bearings according to FIG. 2.

Figure 5:
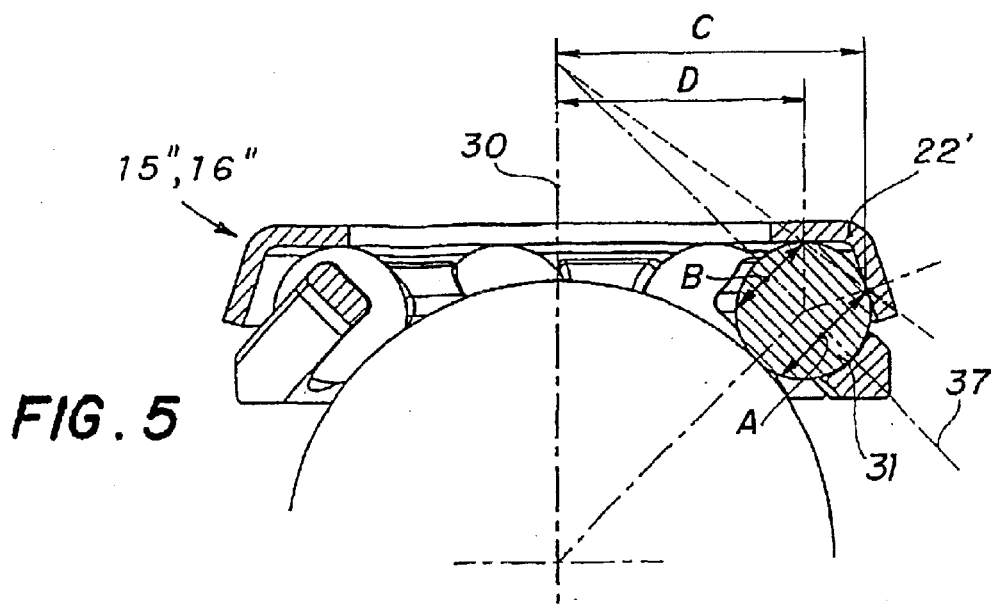
FIG. 5 is a detailed sectioned view of a variant of a bearing according to FIG. 3.

The inner raceway 23' can be replaced by a spherical surface such as that shown in FIG. 5, or by a conical surface, so that there will be no more than three contact points between each ball and the raceways. The conical or spherical surface may be realized by a raceway, for instance made of stamped steel metal and hardened by tempering, or machined or otherwise formed, directly on the rotary member 9.

What is claimed is:

1. Actuator for the linear displacement of a member to be controlled, comprising a motor part (2) and an actuating device part (3) comprising a rotary member (9) provided with a threaded portion (10) complementary to a thread of a screw (11), the rotary member (9) being able to be rotated by the motor part and being supported by bearings (15, 16; 15', 16'; 15", 16") in the form of thrust ball bearings with three or four contact points arranged on either axial side of said threaded portion for axial and radial guidance of the rotary member, raceways of the balls (22, 24, 23, 25; 22', 23') being integrated, on one hand into the rotary member (9) and on the other hand into the housing (14) or cover (13) parts of the actuator, and wherein inclined walls radially inward (26, 26') and radially outward (27, 27') of the raceways are arranged so as to satisfy the relation: A/B=C/D, where D and C are the radii of the contact points radially inward (28, 28') and radially outward (29, 29") from the axis of rotation (30) of the rotary member, while B is the diameter of the circle traveled by the contact points radially inward (28, 28') on a ball (31), and A is the diameter of the circle traveled by the contact points radially outward (29, 29') on a ball (31).

2. Actuator according to claim 1, wherein the raceways are made of stamped sheet metal.

3. Actuator according to claim 1, wherein the raceways are attached to the cover part, the rotary member, or the housing part by snapping in, molding on, welding, or gluing.

4. Actuator according to claim 1, wherein the actuator further comprises a partition wall (4) separating the motor part from the actuating device part and having a portion located in an air gap (7) between the motor part and the rotary member of the actuating part.

5. Actuator according to claim 4, wherein the partition wall extends up to a portion (32) in the shape of an external flange that can be mounted on a support or on an assembly wall of a device to be controlled.

6. Actuator according to claim 4, wherein the partition wall (4) is made of a conducting material having a good magnetic permeability.

7. Actuator according to claim 6, wherein the partition wall (4) is made of sheet metal.

8. Actuator according to claim 4, wherein the partition wall is also a structural element allowing the mounting and positioning of the motor part and of the actuating part.

* * * * *